Dec. 22, 1936.                S. E. BOUCHARD                2,064,812
                                  GOGGLES
                             Filed Dec. 16, 1935
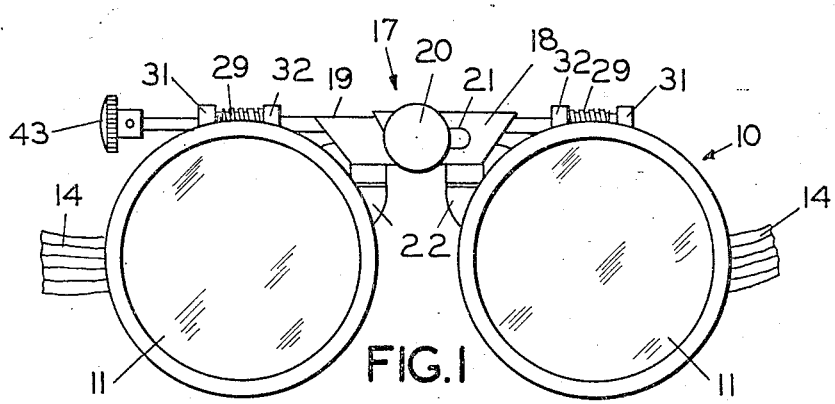
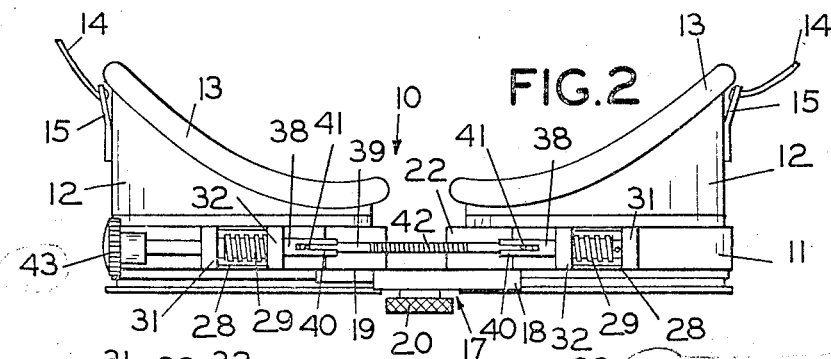
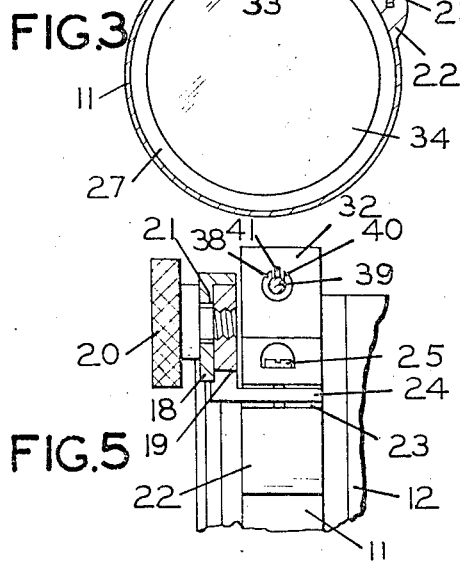
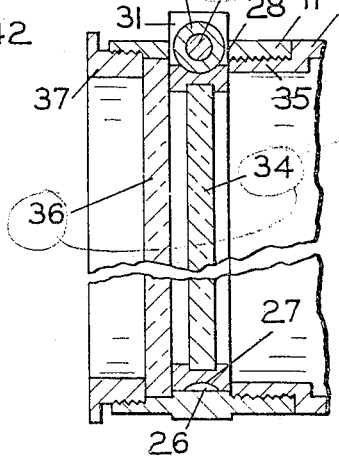
SAMUEL E. BOUCHARD
INVENTOR
BY
ATTORNEY Patented Dec. 22, 1936

2,064,812

UNITED STATES PATENT OFFICE 2,064,812

GOGGLES

Samuel E. Bouchard, Rochester, N. Y., assignor to Bausch & Lomb Optical Company, Rochester, N. Y., a corporation of New York Application December 16, 1935, Serial No. 54,559

5 Claims. (Cl. 88—41)

The present invention relates to goggles and more particularly to goggles having a rotatable optical element in each eye unit.

One of the objects of the present invention is to provide an improved pair of goggles in which the transmission can be selectively increased or decreased. Another object is to provide a pair of goggles having in each eye unit a fixed and a rotatable polarizing element and having means for rotating the polarizing elements in unison. A further object is to provide a pair of goggles having in each eye unit a rotatable optical element, having an adjustable bridge connecting the eye units and having a flexible shaft for rotating the optical elements in unison. These and other objects and advantages reside in certain novel features of construction, arrangement and combination of parts as will hereinafter be more fully set forth and pointed out in the appended claims.

Referring to the drawing:

Fig. 1 is a front view of a pair of goggles embodying this invention.

Fig. 2 is a top plan view of same.

Fig. 3 is a vertical section through one of the eye units perpendicular to the optical axis.

Fig. 4 is an enlarged, fragmentary vertical section through one of the eye units parallel to the optical axis.

Fig. 5 is an enlarged, fragmentary vertical section through the bridge.

One embodiment of the present invention is illustrated in the drawing wherein 10 indicates, generally, a pair of goggles having two eye units 11. Each of the eye units 11 has a rearwardly extending eye cup 12 provided with a rubber cushion 13, and an elastic head band 14 is secured at its ends to brackets 15 on the eye cups 12. The eye units 11 are connected by a bridge 17 which consists of two relatively slidable members 18 and 19 and a screw 20 for securing them in a desired adjusted position. The front member 18 is channel-shaped and has a slot 21 formed therethrough. The rear member 19 is slidable in the channel shaped front member 18 and the screw 20 extends through the slot 21 and is threaded into the rear member 19.

As the connection between the bridge member 18 and one eye unit 11 is the same as the connection between the bridge member 19 and the other eye unit 11, only the latter connection will be described. A projection 22, having a slot 23, is formed on the eye unit 11 and the bridge member 19 has a rearwardly extending plate 24 which fits loosely in the slot 23 and is pivotally secured therein by a screw 25. Each eye unit 11 is thus rockably secured to the bridge 17 and the separation between the eye units 11 is variable and may be fixed by means of the screw 20.

Each eye unit 11 has a raised internal track 26 and an annular ring 27, of substantially the same width as the track 26, is rotatably mounted within the eye unit 11 on the track 26. An aperture 28 is formed at the upper end of the eye unit 11 and a worm 29, pinned to a shaft 30 which is rotatably journalled in plates 31 and 32 on opposite sides of the aperture 28, extends into the aperture 28 and engages gear teeth 33 on the annular ring 27. A plate 34 of light polarizing material is carried within the annular ring 27 and it can be seen that by rotating the worm 29, the ring 27 will be turned and the axis of polarization of the plate 34, rotated.

The rear end of the eye unit 11 is internally threaded to receive a reduced threaded portion 35 of the eye cup 12. This reduced portion 35 has a smaller internal diameter than the track 26 so that when the eye cup 12 is screwed home, the edge of the reduced portion 35 forms a shoulder against which the annular ring 27 abuts.

A second plate 36 of light polarizing material is located in the front part of the eye unit 11 and this plate 36 is held in fixed position against the shoulder formed by the track 26, by means of an annular ring 37 threaded into the front end of the eye unit. As the plate 36 is fixed, it can be seen that turning the plate 34 will change the relation between the axes of polarization of the plate 34 and the plate 36 and thus increase or decrease the amount of light transmitted by the two plates.

It is desirable that the plates 34 in the eye pieces 11 be rotated in unison so that the amounts of light passing through the two eye units will be always equal. For this reason, the inner end 38 of each shaft 30 is tubular in form so as to receive one end of a shaft 39 which is held between the two shafts 30. The end 38 of each shaft 30 has a longitudinal slot 40 and keys 41 on each end of the shaft 39 engage the slots 40 so that the two worms 29 will be rotated in unison regardless of the separation between the eye units 11. The central portion 42 of the shaft 39 is flexible so as not to interfere with the free rocking of the eye units 11 on the bridge 17 and one of the shafts 30 is extended outward beyond the plate 31 and provided with a knob 43 so that the shafts 30 and 39, the worms 29 and the plates 34 may be rotated in unison.

In assembling the goggles of this invention, the plates 34 are located with their axes of polarization parallel to each other and the axes of polarization of the plates 36 are also made parallel to each other. In this way the angular relation between the axes of polarization of the plates 34 and 36 will always be the same in both eyes and rotation of the knob 43 will increase or decrease the light transmission of both eye units equally. Of course, if it is desired to have the transmission change at a different rate in the two eye units, the angular relation between the axes of polarization in the two eyes would be different.

From the foregoing it will be apparent that I am able to attain the objects of my invention and provide a pair of adjustable goggles having in each eye unit a fixed and a rotatable optical element and having means for rotating the rotatable elements in unison in all adjusted positions of the goggles. Various modifications can, of course, be made without departing from the spirit of my invention or the scope of the appended claims.

I claim:

1. In a pair of goggles, two eye units, an extensible bridge connecting said eye units, each eye unit having a polarizing element fixedly mounted therein, a second polarizing element rotatably mounted therein, and a worm for rotating said rotatable element, extensible means for connecting said worms whereby said rotatable elements can be rotated in unison and means for rotating said extensible means.

2. In a pair of goggles, two eye units, bridge means for rockably connecting said eye units, an optical element rotatably mounted in each eye unit, rotatable means on each eye unit for rotating the element in that unit, and a flexible shaft interconnecting said rotatable means.

3. In a pair of goggles, two eye units, extensible bridge means for rockably connecting said eye units, an optical element rotatably mounted in each eye unit, rotatable means on each unit for rotating the element in that unit, a flexible shaft connecting said rotatable means and means forming a sliding connection between one rotatable means and one end of said shaft.

4. In a device of the character described, two eye units, an extensible bridge connecting said eye units, an optical element rotatably mounted in each eye unit, a worm on each eye unit for rotating the element in that unit, a shaft extending between said worms, means for slidably connecting said shaft to one worm, and means for preventing relative rotation between said shaft and said worms.

5. In a device of the character described, a pair of eye units, a pair of polarizing elements fixedly mounted, one in each eye unit, a second pair of polarizing elements rotatably mounted, one in each eye unit, rotatable means on each eye unit for actuating the rotatable polarizing element, an extensible bridge for rockably connecting said eye units, a flexible shaft connecting said rotatable means and means forming an extensible connection between one of said rotatable means and said shaft.

SAMUEL E. BOUCHARD.